J. BODA.
HARVESTER REEL.
APPLICATION FILED OCT. 19, 1909.
1,008,778.
Patented Nov. 14, 1911.
2 SHEETS—SHEET 1.
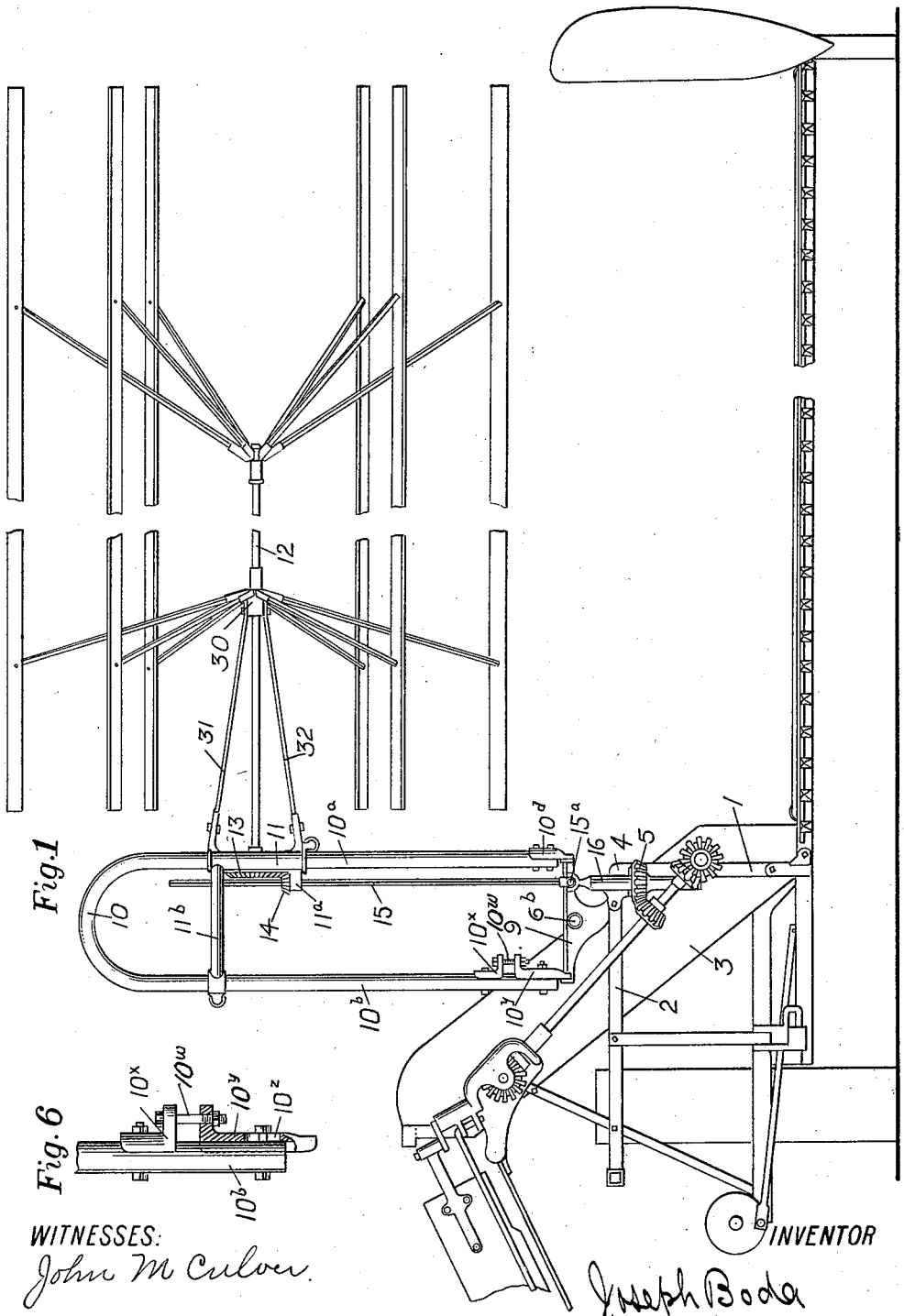

J. BODA.
HARVESTER REEL.
APPLICATION FILED OCT. 19, 1909.
1,008,778.
Patented Nov. 14, 1911.
2 SHEETS—SHEET 2.
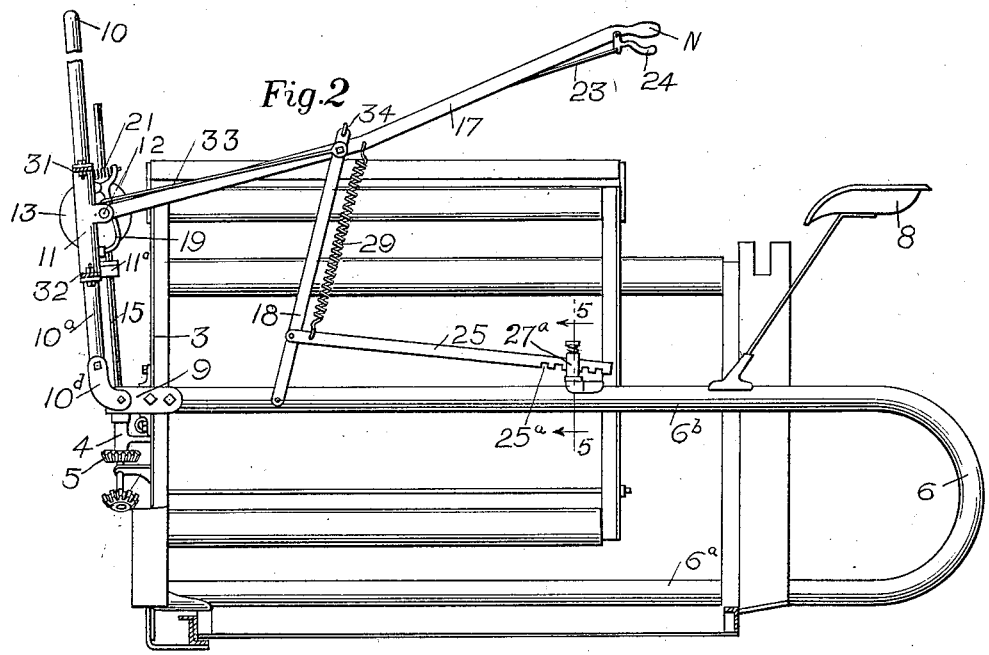
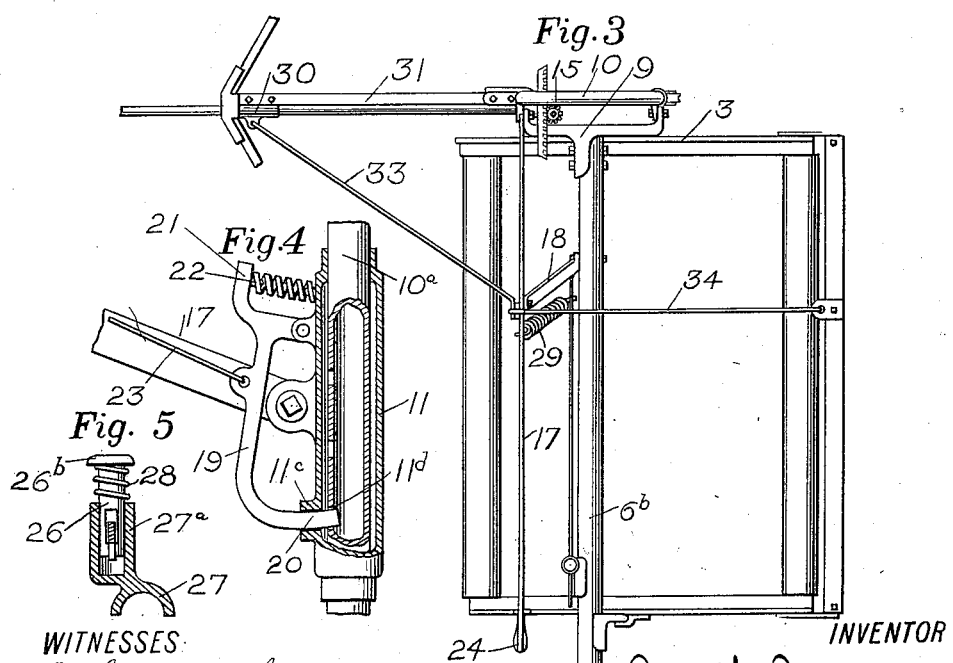
WITNESSES
John M Culver
M. Gertrude Ady
INVENTOR
Joseph Boda
by Newton Newton
his attys

UNITED STATES PATENT OFFICE.

JOSEPH BODA, OF PLANO, ILLINOIS, ASSIGNOR TO INDEPENDENT HARVESTER COMPANY, OF PLANO, ILLINOIS, A CORPORATION OF MAINE.

HARVESTER-REEL.

1,008,778.  Specification of Letters Patent.  Patented Nov. 14, 1911.

Application filed October 19, 1909. Serial No. 523,416.

*To all whom it may concern:*

Be it known that I, JOSEPH BODA, a citizen of the United States, residing at Plano, in the county of Kendall and State of Illinois, have invented new and useful Improvements in Harvester-Reels, of which the following is a specification, reference being had to the accompanying drawings, forming a part thereof.

This invention relates to reels for harvesting machines.

It consists in the features of construction and their combinations shown and described as indicated in the claims.

In the drawings:—Figure 1 is a front elevation of a portion of a harvester comprising a reel embodying this invention. Fig. 2 is a grainward side elevation of the same. Fig. 3 is a top plan view of a portion of the reel frame and immediately adjacent portions of the harvester on which it is mounted. Fig. 4 is a partly sectional detail side elevation of the reel standard and adjusting and locking device, section being made axially with respect to the standard at a portion which is broken away for showing the operation of the locking device. Fig. 5 is a detail section at the line 5—5 on Fig. 2 on a larger scale than Fig. 2. Fig. 6 is a partly sectional detail elevation of a device for adjusting the rail-supporting arched standard, section being made axially with respect to the adjusting screw through the pivot bracket.

The drawings show in a conventional manner the ordinary construction of a harvester reel as to the reel head itself and a portion of the harvester to which the reel-supporting frame is attached. These parts will require no specific description beyond mere mention. The rigid harvester frame is represented by the vertical and horizontal bars, 1 and 2, against which the forward side, 3, of the elevator is mounted, and on which there is also mounted the bracket, 4, which has journal bearings for the gear train which comprises the gear wheel, 5, from which power is communicated to the reel as hereinafter more particularly described. The frame structure also comprises the customary C-shaped or bow frame, 6, having its bow at the rear, and the two arms, $6^a$, $6^b$, extending horizontally fore-and-aft, the latter extending across the elevator at the customary position for carrying the driver's seat, 8. At the forward end of the bar, $6^b$, there is rigidly mounted upon it the fulcrum bracket, 9, upon which there is fulcrumed for rocking fore-and-aft the upstanding inverted U-shaped or bow reel-supporting frame or standard, 10. The grainward limb, $10^a$, of this frame is pivoted at its foot by means of a pivot bracket, $10^d$, to the grainwardly extending arm of the fulcrum bracket, 9, and there is mounted for sliding on it the reel-gearing carriage which comprises a sleeve, 11, which slides on the limb, $10^a$, and a horizontally off-jutting arm or lug, $11^a$. The reel shaft, 12, is journaled on the rear side of the sleeve, 11, and at its inner or stubbleward end carries a bevel gear, 13, which meshes with a bevel pinion, 14, having its hub journaled in the lug, $11^a$, and apertured for the square driving shaft, 15, on which the pinion slides in the adjustment of the reel as hereinafter explained. The shaft, 15, is connected with the shaft, 16, of the gear, 5, by a universal joint, $15^a$, located in alinement with the pivots of the two arms of the frame, 10, on the fulcrum bracket, 9, and between said pivots. For adjusting the reel an operating handle, 17, is pivoted to the reel gearing carriage, 11, and extends rearward therefrom, terminating within reach of the driver's seat (see Fig. 2). Intermediate its pivoted end and the handle, N, it is fulcrumed to the upper part of an upstanding support which is rocker bar, 18, which is fulcrumed at its lower end on the arm, $6^b$, of the bow frame, 6. This construction, it will be seen, permits the driver to raise and lower the reel by sliding the frame, 11, on the limb, $10^a$.

For locking the reel carriage at adjusted position on the standard, 10, there is pivoted to the carriage a dog, 19, having its nose, 20, entered through a guide bearing, $11^c$, on the reel carriage radially with respect to the limb, $10^a$, of the standard, and said limb has a number of apertures, $11^d$, at intervals in the height of the limb, with any one of which the nose, 20, may be engaged. A spring, 22, reacting against the tail, 21, of the dog, 19, operates to force the nose into engagement with any aperture with which the nose may be registered in the sliding of the carriage on the limb, $10^a$, and a rod, 23, connected to the dog extending rearward along the operating handle, 17, is connected with a finger lever, 24, at the rear end of said operating handle for holding the dog disengaged while operating the handle. The handle, 17, serves also for the fore-and-aft adjustment of the reel which is effected by rocking the inverted U-shaped standard, 10, over its fulcrum on the fulcrum bracket, 9; and for locking the reel in adjusted position fore-and-aft there is provided a latch bar, 25, pivoted to the rocker bar, 18, and extending rearward therefrom along the arm, 6$^b$ of the bow frame, 6, and above the same to a position a little forward of the driver's seat, where it is engaged by means of notches, 25$^a$, in its lower edge with a detent, 26. This detent is a pin mounted in a sleeve, 27$^a$, which forms the upwardly projecting arm of a small bracket, 27, mounted on the bar, 6$^b$, the sleeve being apertured fore-and-aft for the passage through it of the latch bar, 25, which passes also through the detent, 26, which is mounted as a plunger in the sleeve, 27$^a$, and engages the notches, 25$^a$, of the latch, being held up into engagement therewith by a spring, 28, stopped between the head, 26$^b$, of the plunger and the upper end of the sleeve, 27$^a$. The whole device is positioned so that the head, 26$^b$, is easily reached by the foot of the driver to depress it for disengaging the detent plunger from the latch. Preferably, to ease the action partly counterbalancing the weight of the reel, a contractile spring, 29, is connected at one end to the handle lever, 17, and at the other end to the latch bar, 25, the connection being so near the pivot of the latch bar to the rocker bar, 18, as not to be liable to operate to disengage the latch bar from the detent.

The reel carriage, 11, has an arm, 11$^b$, which extends across the inverted U-shaped standard, 10, and is engaged with the stubbleward limb of that frame for the purpose of preventing the sleeve of the carriage which slides on the grainward limb from cramping thereon, and this is in part the purpose of making the reel standard of inverted U-shape, as shown. Another purpose of this form of standard is to afford means for correcting the tendency of the overhung reel by its weight to distort the standard, causing it to lean grainward. For the purpose of such correction, the foot of the stubbleward limb, 10$^b$, of the inverted U-shaped standard is connected with the fulcrum bracket, 9, by means of a bracket, 10$^x$, bolted on to the said limb, 10$^b$, and a pivot bracket, 10$^y$, also bolted on to the end of said limb, the securing bolt taking through a slot, 10$^z$, in said bracket, which permits adjustment of the bracket longitudinally of the limb, the two brackets, 10$^x$ and 10$^y$, being connected by an adjusting bolt, 10$^w$. The separation between the proximate ends of the brackets, 10$^x$ and 10$^y$, in the original construction is sufficient to allow for what amounts to substantially contracting the limb, 10$^b$, by drawing the two brackets together by means of the bolt, 10$^w$, which may be done whenever any grainward leaning of the standard is observed requiring correction.

The overhung reel tends to vibrate fore-and-aft and transversely when the machine is traveling over uneven ground, and such vibration not only tends to distort the reel shaft but also to wrench the reel-supporting structure. To reduce this tendency to the minimum, or to counteract it to some extent, the grainward bearing, 30, of the reel shaft is positioned at a considerably remote distance grainward from the limb, 10$^a$, of the reel standard being braced in that position by upper and lower braces, 31 and 32, which extend to the upper and lower ends of the reel carriage, and further, especially, to brace the reel against the vibration mentioned, a brace-and-tie rod, 33, is extended from said bearing, 30, rearward to the fulcrum of the handle bar, 17, on the rocker, 18. The rocker bar is tied and braced against right-and-left oscillation by a tie-and-brace rod, 34, which extends from the upper end of said rocker bar substantially horizontally stubbleward to the fore-and-aft frame bar, 34, of the harvester which is customarily found at the head of the elevator. The fore-and-aft rocking of the rocker bar, 18, for the fore-and-aft adjustment of the reel is not materially interfered with, nor is the position or path of rocking of said rocker bar materially deflected out of the normal fore-and-aft direction by the operation of the tie, 34, as a radius rod, the flexibility of the parts being sufficient to accommodate the slight deflection from a direct fore-and-aft path which is compelled by this connection of the rocker bar to a fixed point on the harvester frame; and the resistance afforded by the tie rod, 34, to the right-and-left swaying, as well as the fore-and-aft swaying of the reel structure, saves said structure a large portion of the wrench to which it is ordinarily subjected from such cause.

I claim:—

1. A harvester reel support comprising, in combination with a harvester frame, a bow-shaped standard having the bow upward, fulcrumed at its foot on the harvester frame, one of the limbs of the bow being parted, and means connecting the two parts adjustably for contracting and extending said limb.

2. A harvester reel support comprising, in combination with the harvester frame, a standard fulcrumed at its foot on the harvester frame comprising two parallel limbs rigidly united; a reel carriage mounted for sliding on one of said limbs and having an arm engaging the other limb; an operating handle connected to said reel carriage and extending rearward; a rocker bar fulcrumed at its foot on the harvester frame and having said operating handle pivoted to it above its fulcrum; means for releasably engaging the carriage with the limb on which it slides; releasing means for said engaging device mounted on the operating handle; a latch bar pivoted to the rocker bar extending rearward, and an engaging device for the latch bar mounted on the frame.

3. In a harvester reel, in combination with the harvester frame, a reel standard fulcrumed at its foot on the harvester frame for rocking fore-and-aft; a reel carriage mounted for sliding up and down on said standard; an operating handle connected to the reel carriage and extending rearward; a fulcrum support for said handle mounted for rocking on the harvester frame; a reel head having its shaft journaled in the reel carriage; a link extending from the reel head to the rocking fulcrum support of the handle and pivotally connected thereto near the fulcrum of the handle thereon, and a rod pivotally connected with the rocking fulcrum support and extending thence stubbleward and connected to a rigid part of the harvester frame.

In testimony whereof, I have hereunto set my hand at Plano, Illinois, this 15 day of October, 1909.

JOSEPH BODA.

Witnesses:
W. C. THOMPSON,
WM. CUMMINS.

---

Copies of this patent may be obtained for five cents each, by addressing the "Commissioner of Patents, Washington, D. C."